US012017351B2

(12) United States Patent
Rod et al.

(10) Patent No.: US 12,017,351 B2
(45) Date of Patent: Jun. 25, 2024

(54) REMOTE CONTROL SYSTEM, INFORMATION PROCESSING METHOD, AND NON-TRANSITORY COMPUTER-READABLE RECORDING MEDIUM

(71) Applicant: Telexistence Inc., Tokyo (JP)

(72) Inventors: Jan Rod, Tokyo (JP); Jose Enrique Chen, Tokyo (JP); Genki Sano, Tokyo (JP)

(73) Assignee: TELEXISTENCE INC., Tokyo (JP)

( * ) Notice: Subject to any disclaimer, the term of this patent is extended or adjusted under 35 U.S.C. 154(b) by 889 days.

(21) Appl. No.: 16/953,013

(22) Filed: Nov. 19, 2020

(65) Prior Publication Data
US 2021/0069894 A1 Mar. 11, 2021

Related U.S. Application Data

(63) Continuation of application No. PCT/JP2019/019930, filed on May 20, 2019.

(30) Foreign Application Priority Data

May 21, 2018 (JP) ................. 2018-097145

(51) Int. Cl.
B25J 9/00 (2006.01)
B25J 9/16 (2006.01)
(Continued)

(52) U.S. Cl.
CPC .......... B25J 9/0081 (2013.01); B25J 9/1689 (2013.01); B25J 13/084 (2013.01); B25J 19/023 (2013.01);
(Continued)

(58) Field of Classification Search
None
See application file for complete search history.

(56) References Cited

U.S. PATENT DOCUMENTS 6,120,433 A 9/2000 Mizuno et al.
2003/0033024 A1 2/2003 Sunaoshi
(Continued)

FOREIGN PATENT DOCUMENTS

JP S60-126985 A 7/1985
JP H05-050382 A 3/1993
(Continued)

OTHER PUBLICATIONS

Insaf Ajili, Gesture Recognition for Humanoid Robot Teleoperation, 2017 26th IEEE International Symposium on Robot and Human Interactive Communication (RO-MAN) Lisbon, Portugal, Aug. 28-Sep. 1, 2017 (Year: 2017).*

(Continued)

Primary Examiner — Jaime Figueroa
Assistant Examiner — Arslan Azhar
(74) Attorney, Agent, or Firm — Rankin, Hill & Clark LLP

(57) ABSTRACT

A slave robot moves in conjunction with a change of a posture of an operator in a remote control system. A capture device acquires a signal indicating a posture of an operator's body. A control apparatus includes a receiving controller that receives a signal indicating a posture of the slave robot from the slave robot and receives the signal indicating the posture of the operator's body from the capture device, a posture comparing part that acquires a posture error indicating a difference between the posture of the slave robot and the posture of the operator, and a motion connecting part that transmits, to the slave robot, an operation signal for operating the slave robot generated on the basis of the change in (Continued)

the posture of the operator on a condition that the posture error is within a predetermined threshold range.

13 Claims, 8 Drawing Sheets

(51) Int. Cl.
*B25J 13/08* (2006.01)
*B25J 19/02* (2006.01)
*G02B 27/01* (2006.01)

(52) U.S. Cl.
CPC ....... *G02B 27/017* (2013.01); *G02B 27/0179* (2013.01); *G02B 2027/0187* (2013.01)

(56) References Cited

U.S. PATENT DOCUMENTS

| | | | |
|---|---|---|---|
| 2007/0233318 A1 | 10/2007 | Lei | |
| 2012/0290134 A1* | 11/2012 | Zhao | A61B 90/361 |
| | | | 901/47 |
| 2013/0211587 A1 | 8/2013 | Stephens, Jr. | |
| 2013/0211592 A1 | 8/2013 | Kim | |
| 2013/0211594 A1 | 8/2013 | Stephens, Jr. | |
| 2014/0073423 A1 | 3/2014 | Krzeslo et al. | |
| 2014/0094968 A1* | 4/2014 | Taylor | B25J 13/006 |
| | | | 700/257 |
| 2016/0217614 A1* | 7/2016 | Kraver | G02B 27/017 |
| 2016/0257000 A1* | 9/2016 | Guerin | B25J 9/1671 |
| 2017/0129105 A1 | 5/2017 | Stephens, Jr. | |
| 2017/0322629 A1* | 11/2017 | Pirasmepulkul | G06F 3/0346 |
| 2017/0360519 A1 | 12/2017 | Yorimoto et al. | |
| 2017/0367777 A1* | 12/2017 | Kralicky | A61B 34/37 |
| 2019/0258316 A1 | 8/2019 | Suzuki et al. | |
| 2020/0384654 A1* | 12/2020 | Bae | B25J 13/088 |

FOREIGN PATENT DOCUMENTS

| | | |
|---|---|---|
| JP | H08-117238 A | 5/1996 |
| JP | H08-257948 A | 10/1996 |
| JP | H09-066476 A | 3/1997 |
| JP | 2001-198865 A | 7/2001 |
| JP | 2003-053685 A | 2/2003 |
| JP | 2012-517847 A | 8/2012 |
| JP | 2017-119043 A | 7/2017 |
| JP | 2019-063951 A | 4/2019 |
| WO | 2016/194539 A1 | 12/2016 |
| WO | 2018/061683 A1 | 4/2018 |

OTHER PUBLICATIONS

Charith Lasantha Fernando, Design of TELESAR V for Transferring Bodily Consciousness in Telexistence, 2012 IEEE/RSJ International Conference on Intelligent Robots and Systems Oct. 7-12, 2012. Vilamoura, Algarve, Portugal (Year: 2012).*
Fernando, et al., "Design of Telesar V for Transferring Bodily Consciousness in Telexistence", IEEE International Conference on Intelligent Robots and Systems 2012, pp. 5112-5118, 7 pages.
International Search Report, International Application No. PCT/JP2019/019930 dated Aug. 13, 2019, with English translation, 6 pages.
PCT Notification of Transmittal of Translation of the International Preliminary Report on Patentability dated Dec. 3, 2020, PCT/JP2019/019930, including Written Opinion and English translation, 23 pages.

* cited by examiner

|  | Start of synchronization | End of synchronization |
|---|---|---|
| Shape of marker | cube | sphere |
| Touch of marker | smooth | rough |
| Standby period when switching | 5 seconds | 5 seconds |
| Effect when switching | Fade-in Fade-out | instantaneous |
| Message after switching | NONE | Have a nice day |

FIG. 7

REMOTE CONTROL SYSTEM, INFORMATION PROCESSING METHOD, AND NON-TRANSITORY COMPUTER-READABLE RECORDING MEDIUM

CROSS-REFERENCE TO RELATED APPLICATIONS

The present application is a continuation application of International Application No. PCT/JP2019/019930, filed on May 20, 2019, which claims priority to Japanese Patent Application No. 2018-097145, filed on May 21, 2018. The contents of these applications are incorporated herein by reference in their entirety.

BACKGROUND OF THE DISCLOSURE

The present disclosure relates to a remote control system, an information processing method, and a program.

A technique for allowing an operator who remotely controls a slave robot located away from the operator to experience sensations such as vision, hearing, and tactile sensation that would be acquired if the operator were in a place where he/she is not actually present has been proposed (see, for example, Fernando, C. L., Furukawa, M., Kurogi, T., Kamuro, S., Sato, K., Minamizawa, and S. Tachi, "Design of TELESAR v for transferring bodily consciousness in telexistence", IEEE International Conference on Intelligent Robots and Systems 2012, pp. 5112-5118). This technique is also called telepresence, telexistence (a registered trademark of the applicant), or the like. In the remote control system disclosed in "Design of TELESAR v for transferring bodily consciousness in telexistence", a slave robot is a humanoid robot, and a corresponding part of the slave robot moves in synchronization with a motion of an operator's body (such as a head, torso, arm, and hand).

The operator of the slave robot wears a shielded head-mounted display to share the view of the slave robot, that is, video captured by an imaging element provided to the slave robot. When the slave robot starts synchronizing with a motion of the operator, the view of the operator is also synchronized with the view of the slave robot via the head-mounted display.

BRIEF SUMMARY OF THE DISCLOSURE

If the motion of the operator's own body deviates from the motion of the part of the slave robot displayed on the head-mounted display when synchronization between the motion of the operator and the slave robot is started, the operator tends to feel uncomfortable in operating the slave robot due to a discrepancy in sensations.

The present disclosure focuses on these points, and an object of the present disclosure is to provide a technique for reducing a discrepancy in sensations felt by an operator upon starting synchronization between a motion of a slave robot of a remote control system and a motion of the operator.

A first aspect of the present disclosure is a remote control system. This system includes a slave robot that moves in conjunction with a change in a posture of an operator, a capture device that acquires a signal indicating a posture of an operator's body, and a control apparatus. Here, the control apparatus includes a receiving controller that receives a signal indicating a posture of the slave robot from the slave robot and receives the signal indicating the posture of the operator's body from the capture device, a posture comparing part that acquires a posture error indicating a difference between the posture of the slave robot and the posture of the operator, and a motion connecting part that transmits, to the slave robot, an operation signal for operating the slave robot generated on the basis of the change in the posture of the operator on a condition that the posture error is within a predetermined threshold range.

A second aspect of the present disclosure is an information processing method performed by a processor included in the control apparatus in a remote control system including a slave robot moving in conjunction with a change in a posture of an operator, a capture device for acquiring a signal indicating a posture of the operator's body, and a control apparatus. The method includes receiving a signal indicating the posture of the slave robot from the slave robot, receiving a signal from the capture device indicating the posture of the operator's body, acquiring an posture error indicating a difference between the posture of the slave robot and the posture of the operator, and transmitting, to the slave robot, an operation signal for operating the slave robot generated on the basis of a change in the posture of the operator on a condition that the posture error becomes within a predetermined threshold.

A third aspect of the present disclosure is a non-transitory computer-readable recording medium recording a program. This program causing a control apparatus in a remote control system to implement functions, the remote control system including a slave robot that moves in conjunction with a change in the posture of the operator, a capture device that acquires a signal indicating the posture of the operator's body, and the control apparatus, the functions includes receiving a signal indicating the posture of the slave robot from the slave robot, receiving a signal indicating the position of the operator's body from the capture device, acquiring an posture error indicating a difference between the posture of the slave robot and the posture of the operator, and transmitting, to the slave robot, an operation signal for operating the slave robot generated on the basis of the change in the posture of the operator on a condition that the posture error becomes within a predetermined threshold range.

It should be noted that any combination of the above constituent elements, at least a part of the expression of the present disclosure converted between a method, an apparatus, a system, a computer program, a data structure, a recording medium, and the like, is also effective as an embodiment of the present disclosure. In order to update at least a part of the program, a computer-readable recording medium on which the program is recorded may be provided, and the program may be transmitted through a communication line.

BRIEF DESCRIPTION OF THE DRAWINGS

FIG. 7 shows an operation of the control apparatus at the start/end of the synchronization between the motion of the slave robot and the motion of the operator in a table format.

DETAILED DESCRIPTION OF THE DISCLOSURE

<An Outline of a Remote Control System>

Figure 1:
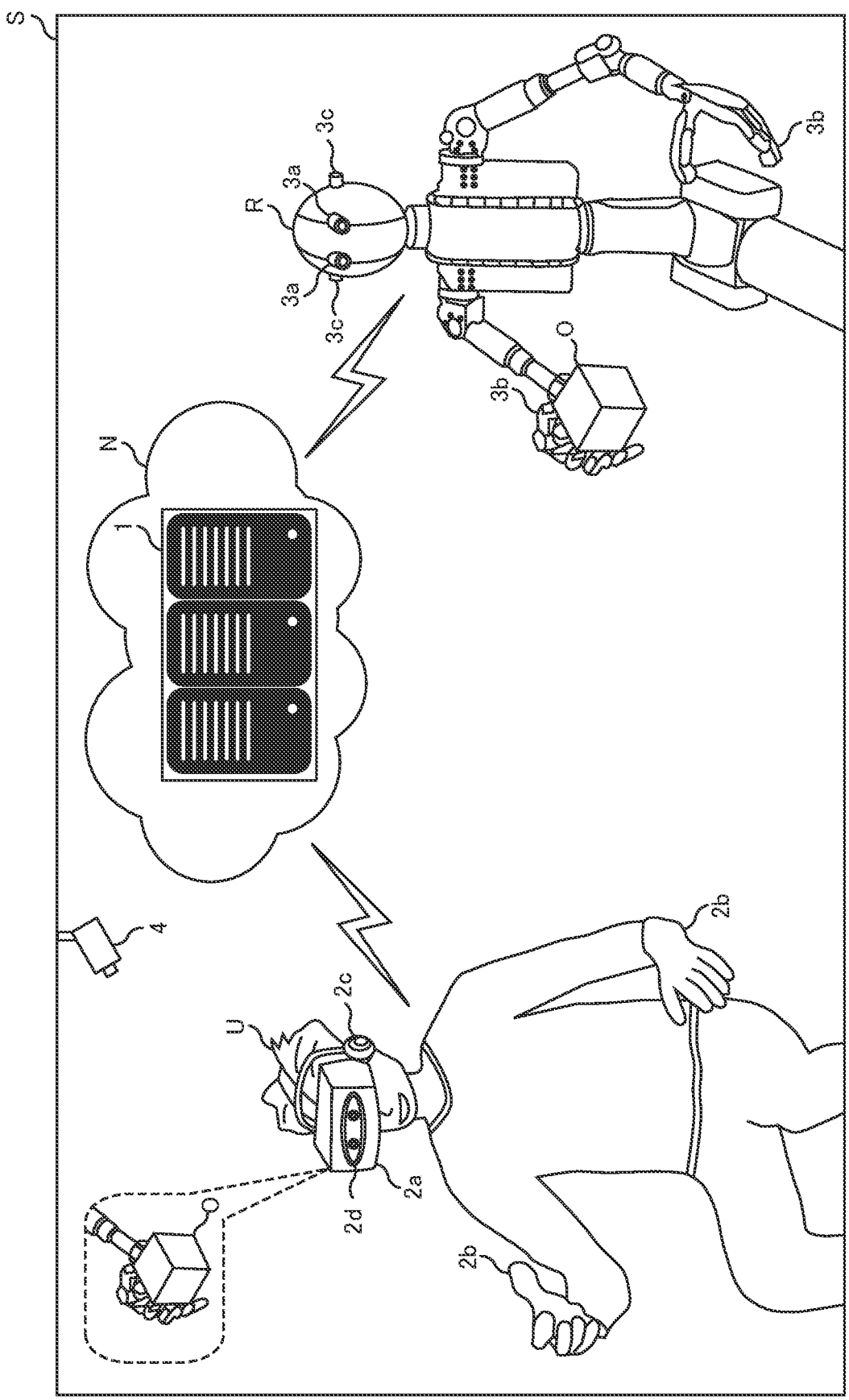
FIG. 1 schematically shows an appearance of components of a remote control system.
Figure 2:
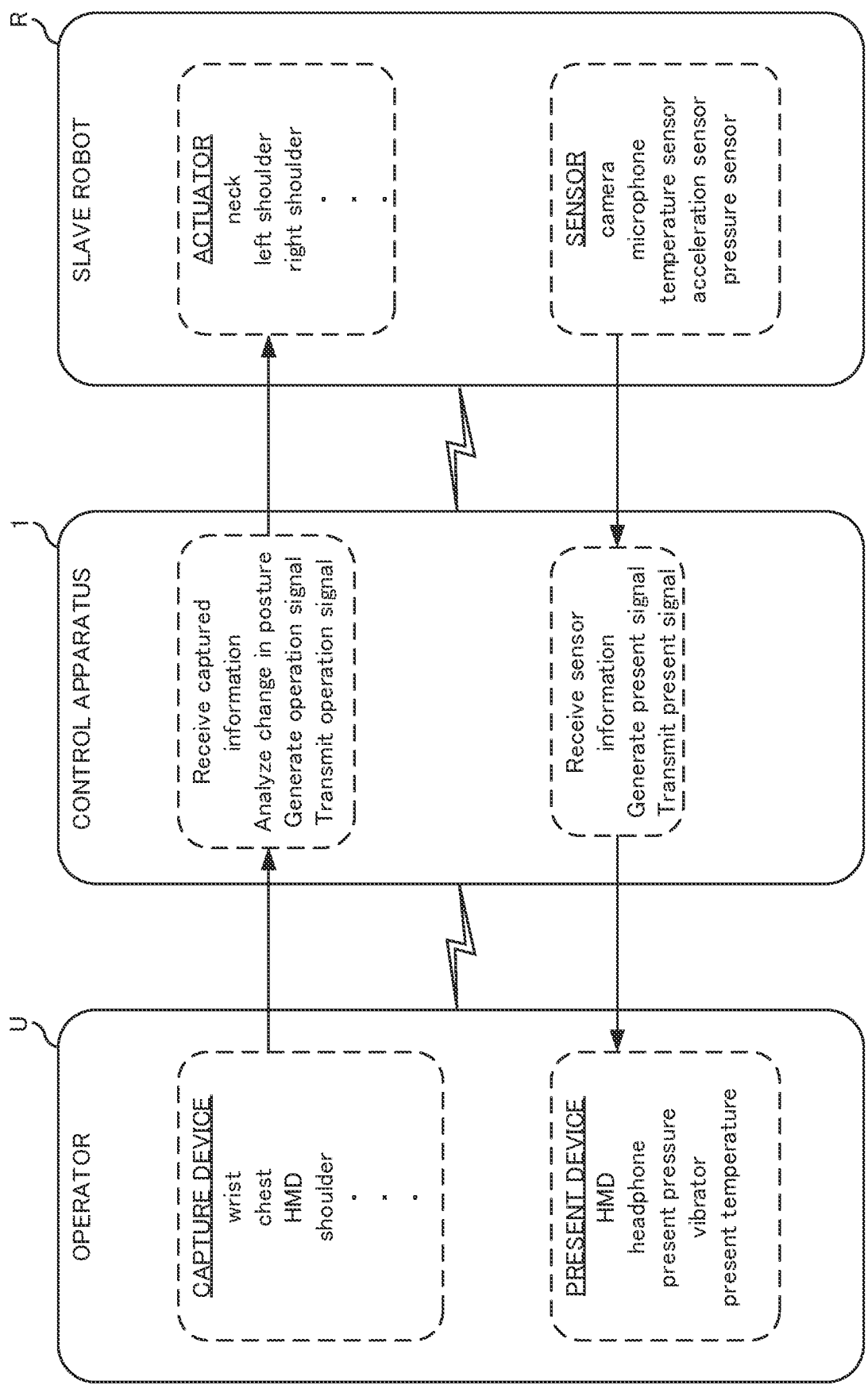
FIG. 2 schematically shows the components of the remote control system and a flow of information exchanged between the components.

FIG. 1 schematically shows an appearance of components of a remote control system S. Further, FIG. 2 schematically shows the components of the remote control system S and a flow of information exchanged between the components. Hereinafter, an outline of the remote control system S is described first while referencing FIGS. 1 and 2.

As shown in FIG. 1, an operator U utilizing the remote control system S wears various presentation devices 2 (a head-mounted display 2a, tactile presentation devices 2b, a headphone 2c, and an imaging element 2d). A motion of an operator U's body is tracked by a capture device 4. The capture device 4 is a known motion capture device using, for example, infrared or visible light, and acquires a signal indicating a posture of the operator U's body by capturing a tracking marker attached to the operator U's body and transmits the signal to a control apparatus 1.

A slave robot R is provided with various sensors 3 (imaging elements 3a, tactile sensors 3b, and microphones 3c), and sensor information acquired by the respective sensors 3 is transmitted to the control apparatus 1. It should be noted that the tactile sensor 3b includes a temperature sensor 31, an acceleration sensor 32, and a pressure sensor 33.

As shown in FIG. 1, the slave robot R is a machine made in imitation of a form of a human. Therefore, the imaging element 3a is disposed at a position corresponding to an eye of the slave robot R. Likewise, the tactile sensor 3b is disposed at a position corresponding to a fingertip of the slave robot R, and the microphone 3c is disposed at a position corresponding to an ear of the slave robot R.

The control apparatus 1 is a cloud server existing on a communication network N. As shown in FIG. 2, the control apparatus 1 analyzes a change in the posture of the operator U on the basis of the signal indicating the posture of the operator U's body. The control apparatus 1 generates an operation signal for operating the slave robot R on the basis of the change in the posture of the operator U and transmits said signal to the slave robot R. The slave robot R is equipped with an actuator in each part of the neck, shoulder, elbow, and the like, and the operation signal generated by the control apparatus 1 is a signal for operating these actuators. This allows the slave robot R to move in conjunction with the change in the posture of the operator U.

The control apparatus 1 generates, on the basis of the sensor information acquired from the sensor 3 provided to the slave robot R, a presentation signal for operating the presentation device 2 worn by the operator U and transmits the said signal to the presentation device 2. For example, image information acquired by the imaging element 3a is converted into an image signal to be presented to the head-mounted display 2a by the control apparatus 1. Thus, the operator U can see video captured by the imaging element 3a which is the "eye" of the slave robot R through a monitor of the head-mounted display 2a. FIG. 1 shows a state in which the monitor of the head-mounted display 2a displays a right hand of the salve robot R and a cube which is a contact object O held by the right hand of the slave robot R.

Similarly, tactile information, including temperature, vibration, and pressure, acquired by the tactile sensor 3b is converted into a tactile presentation signal for operating the tactile presentation device 2b by the control apparatus 1. Thus, the operator U can feel the tactile sensation captured by the "fingertip" of the slave robot R through the tactile presentation device 2b.

In the remote control system S according to the embodiment, the head-mounted display 2a is a shielded head-mounted display. Therefore, the operator U observing the video captured by the imaging element 3a via the head-mounted display 2a can acquire an immersive feeling as if the operator U were in the location of the slave robot R.

On the other hand, once the operator U wears the head-mounted display 2a, the operator U cannot see his/her surroundings. Since the head-mounted display 2a also operates as a part of a capture device, the operator U needs to wear the head-mounted display 2a before synchronizing the motion of the slave robot R with the motion of the operator U. Because the operator U wears the head-mounted display 2a before the image signal is transmitted from the control apparatus 1 to the head-mounted display 2a, it is inconvenient for the operator U to not be able to see his/her surroundings until the synchronization between the motion of the operator U and the motion of the slave robot R is started.

Therefore, as shown in FIG. 1, the head-mounted display 2a includes the imaging element 2d for capturing a line-of-sight direction of the operator U when worn by the operator U. This allows the operator U to observe the surroundings of the operator U while wearing the head-mounted display 2a.

As described above, the slave robot R moves in conjunction with the change in the posture of the operator U and includes a group of sensors that acquires the signal for operating the presentation device 2 worn by the operator U. Using the remote control system S according to the embodiment allows the operator U to experience sensations such as vision, hearing, and touch that would be acquired if the operator were in a place where he/she is not actually present but the slave robot is.

<A Functional Configuration of the Control Apparatus According to the Embodiment>

Based on the above, the control apparatus 1 according to the embodiment will be described.

Figure 3:
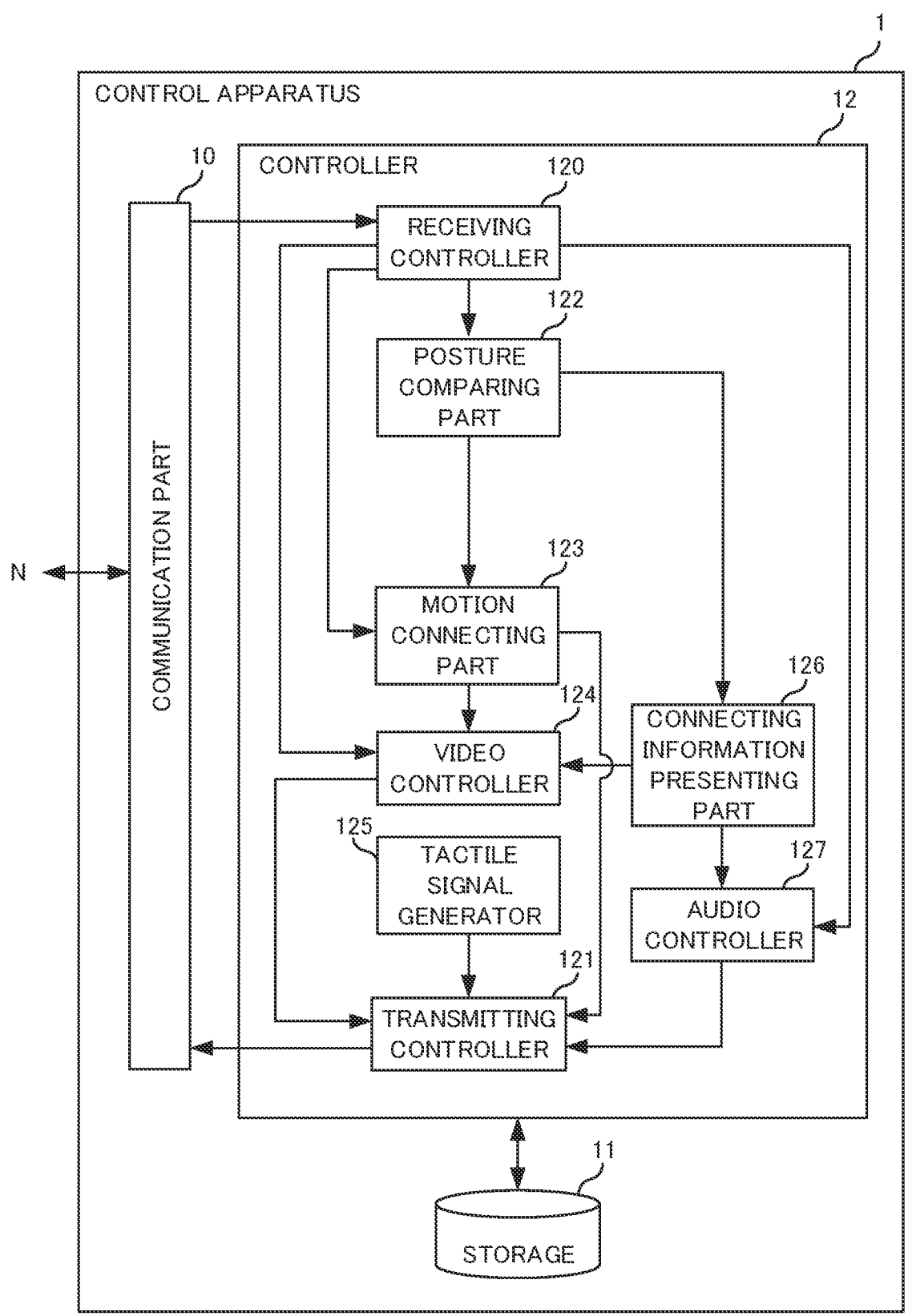
FIG. 3 schematically shows a functional configuration of a control apparatus according to the embodiment.

FIG. 3 schematically shows a functional configuration of the control apparatus 1 according to the embodiment. The control apparatus 1 includes a communication part 10, a storage 11, and a controller 12.

The communication part 10 transmits and receives data to and from the presentation device 2 provided to the operator U, the sensor 3 provided to the slave robot R, and the capture device 4 via the communication network N. The storage 11 is a mass storage device such as a Read Only Memory (ROM) for storing a Basic Input Output System (BIOS) of a computer that implements the control apparatus 1, a Random Access Memory (RAM) for a work area of the control apparatus 1, and a Hard Disk Drive (HDD) and a Solid State Drive (SSD) for storing various information including an Operating System (OS) and an application program, and various databases referenced when executing the application program.

The controller 12 is a processor such as a Central Processing Unit (CPU) or a Graphics Processing Unit (GPU) of the control apparatus 1, and functions as a receiving controller 120, a transmitting controller 121, a posture comparing part 122, a motion connecting part 123, a video controller 124, a tactile signal generator 125, a connecting information presenting part 126, and an audio controller 127 by executing the program stored in the storage 11.

It should be noted that the control apparatus 1 may be implemented by a computing resource such as a plurality of processors and memories like, for example, a cloud computing system. In this case, each unit included by the controller 12 is implemented by executing the program with at least one processor among a plurality of different processors.

Both the receiving controller 120 and the transmitting controller 121 are implemented by a Local Area Network (LAN) controller, for example. The receiving controller 120 receives data from a device outside the control apparatus 1 via the communication part 10. The transmitting controller 121 transmits data to the device outside the control apparatus 1 via the communication part 10. Hereafter, on the assumption that the receiving controller 120 and the transmitting controller 121 transmit/receive data to/from the device outside via the communication part 10, descriptions such as "the receiving controller 120 receives data" and "the transmitting controller 121 transmits data" will be given.

The receiving controller 120 receives a signal indicating the posture of the slave robot R from the slave robot R. Further, the receiving controller 120 also receives a signal indicating the posture of the operator U's body from the capture device 4. The posture comparing part 122 acquires a posture error indicating a difference between the posture of the slave robot R and the posture of the operator U. Specifically, the posture comparing part 122 calculates the posture of the slave robot R from the signal indicating the posture of the slave robot R, and calculates the posture of the operator U's body from the signal indicating the posture of the operator U's body. Subsequently, the posture comparing part 122 acquires the posture error indicating the difference between the posture of the slave robot R and the operator U on the basis of the calculated postures of the slave robot R and the operator U's body.

Figure 4A:
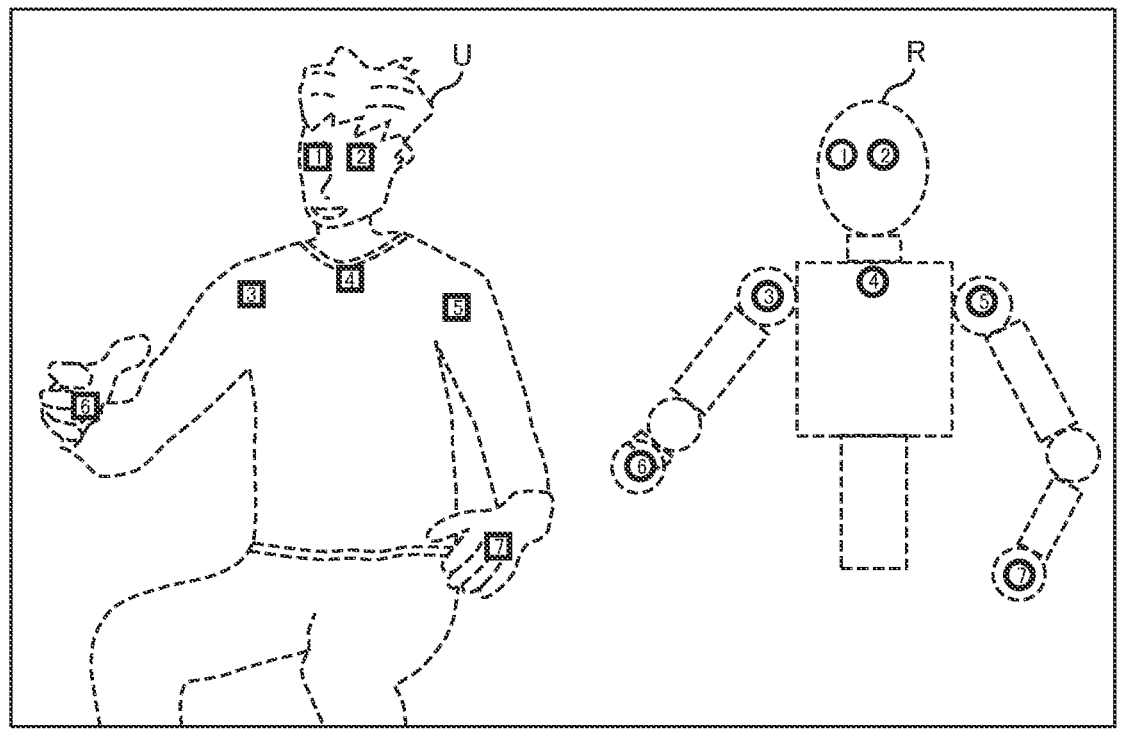
FIG. 4A is a figure for explaining a posture error to be acquired by a posture comparing part according to the embodiment.
Figure 4B:
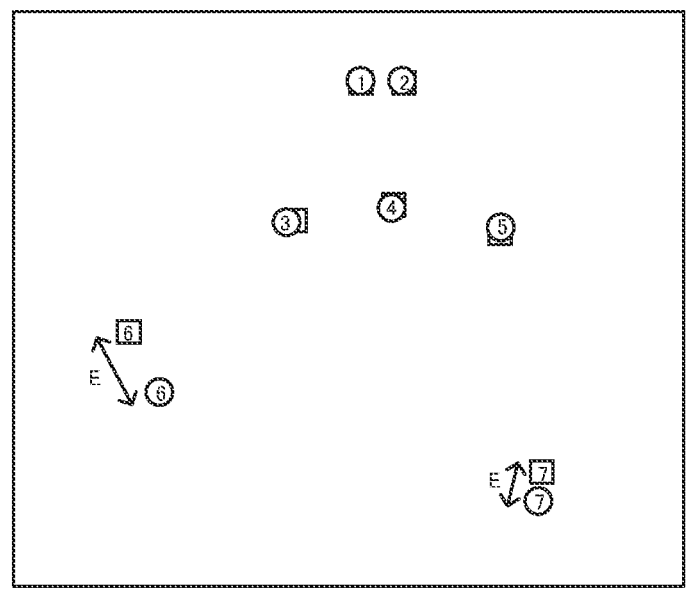
FIG. 4B is a figure for explaining a posture error to be acquired by a posture comparing part according to the embodiment.

FIGS. 4A and 4B are figures for explaining the posture error to be acquired by the posture comparing part 122 according to the embodiment. Specifically, FIG. 4A shows seven feature points respectively set for the operator U and the slave robot R. In FIG. 4A, the numbers enclosed by squares indicate feature points set on the operator U, and the numbers enclosed by circles indicate feature points set on the slave robot R.

The slave robot R according to the embodiment is a humanoid robot having at least a head portion and a hand portion corresponding to the head portion and the hand portion of the operator U, respectively. Among the feature points set on the operator U and the feature points set on the slave robot R, the same numerals indicate corresponding feature points. For example, "1" enclosed by a square is a feature point set on the right eye of the operator U, and "1" enclosed by a circle is a feature point set on the imaging element 3a provided to the right-hand side of the slave robot R. Hereinafter, if the feature point set on the operator U and the feature point set on the slave robot R are not particularly distinguished from each other, each feature point may be represented with a number assigned to the feature point, such as "feature point 1."

The control apparatus 1 acquires and analyzes the information acquired by the capture device 4 tracking the operator U, thereby acquiring positions of the respective feature points set on the operator U. Further, the control apparatus 1 acquires positions of the respective feature points set on the slave robot R by acquiring and analyzing an operation status of the actuator (for example, a rotation angle and the like of the motor) of the slave robot R.

FIG. 4B shows a result of superimposing the feature points set on the slave robot R onto the feature points set on the operator U, where the feature points set on the slave robot R are aligned with the feature points set on the eye of operator U. FIG. 4B shows that feature points 1, feature points 2, feature points 3, feature points 4, and feature points 5 substantially overlap with each other, but feature points 6 and feature points 7 which are the feature points of the "hand portions" deviate from each other. In FIG. 4B, a difference E indicates a deviation between the feature point set on the operator U and the feature point of the slave robot R corresponding to the feature point set on the operator U.

In order to reduce the discrepancy in sensations felt by the operator U, it is preferable that the line-of-sight direction of the operator U and the line-of-sight direction of the slave robot R correspond with each other when the synchronization between the motion of the operator U and the motion of the slave robot R is started. This is because the operator U tends to feel sick if the line-of-sight directions deviate from each other when the synchronization between the motions of the operator U and the slave robot R is started.

Further, in order to reduce the discrepancy in sensations felt by the operator U, it is also preferable that positions of the hand portion of the operator U and the hand portion of the slave robot R correspond with each other when the synchronization between the motion of the operator U and the motion of the slave robot R is started. Because the hand portion is a portion that the operator U moves a lot while operating the slave robot R, if the position of the hand portion of the operator U does not correspond with the position of the hand portion of the slave robot R, the discrepancy in a sense of distance increases, which results in the operator U tending to feel discomfort in operating the slave robot R.

Based on the above, when the slave robot R and the operator U are virtually superimposed, the posture comparing part 122 acquires, as the posture error, 1) the sum of at least a) the difference E between the position of the head portion of the slave robot R and the position of the head portion of the operator U and b) the difference E between the position of the hand portion of the slave robot R and the position of the hand portion of the operator U, or 2) the sum or product of the difference between each portion. In addition, the posture comparing part 122 may add, to the posture error, 1) the difference between the orientation of the head portion of the slave robot R and the orientation of the head portion of the operator U and 2) the difference between the orientation of the hand portion of the slave robot R and the orientation of the hand portion of the operator U. Furthermore, the posture error of not only the head portion and hand portion but also of other body portions such as an arm portion may be added.

Returning to the explanation of FIG. 3, the motion connecting part 123 transmits, to the slave robot R, the operation signal for operating the slave robot R generated on the basis of the change in the posture of the operator U on a condition that the posture error acquired by the posture comparing part 122 is within a predetermined threshold range. It should be noted that the motion connecting part 123 transmitting the operation signal to the slave robot R means that the synchronization between the motion of the operator U and the motion of the slave robot R is started.

The "predetermined threshold range" here is a "threshold range for determining the posture correspondence" referred to by the motion connecting part 123 to determine whether to start the transmission of the operation signal to the slave robot R. The narrower the threshold range for determining the posture correspondence, the less likely the operator U feels the discrepancy in sensations when the synchronization between the motion of the operator U and the motion of the slave robot R is started. On the other hand, as the threshold range for determining the posture correspondence becomes narrower, the accuracy required for the correspondence between the posture of the operator U and the posture of the slave robot R becomes higher, so that it takes time to start the synchronization between the motion of the operator U and the motion of the slave robot R.

Therefore, the specific value for the threshold range for determining the posture correspondence may be determined by a designer of the remote control system S by experiment in consideration of the length of each portion of the slave robot R, the performance of the actuator mounted on the slave robot R, and the like, while balancing the reduction of the discrepancy in sensations felt by the operator U and the smooth synchronization between the motion of the operator U and the motion of the slave robot R.

As described above, the motion connecting part 123 according to the embodiment starts the synchronization between the motion of the operator U and the motion of the slave robot R on a condition that the difference between the posture of the operator U and the posture of the slave robot R is within the predetermined threshold range. This reduces the deviation between the view expected from the line-of-sight direction of the operator U and the view captured by the imaging element 3a of the slave robot R when the operator U starts operating the slave robot R Therefore, the control apparatus 1 according to the embodiment can reduce the discrepancy in sensations felt by the operator U when the synchronization between the motion of the slave robot R of the remote control system S and the motion of the operator U is started.

If the operator U and the slave robot R are located at different places, the operator U cannot directly see the posture of the slave robot R. Therefore, the connecting information presenting part 126 presents information to the operator U to lead him/her to take a posture such that the posture of the slave robot R and the posture of the operator U come to correspond with each other prior to the motion connecting part 123 transmitting the operation signal to the slave robot R.

For example, the connecting information presenting part 126 may present audio guidance to the operator U to lead him/her to take a posture such that the posture of the slave robot R and the posture of the operator U come to correspond with each other. More specifically, first, the connecting information presenting part 126 causes the audio controller to generate audio data for the audio guidance for leading the operator to take a posture such that the posture of the slave robot R and the posture of the operator U come to correspond with each other. Subsequently, the connecting information presenting part 126 may control the audio controller 127 to cause the headphone 2c to reproduce the audio data for the audio guidance.

In addition, the connecting information presenting part 126 may present video guidance to the operator U for leading the operator to take a posture such that the posture of the slave robot R and the posture of the operator U come to correspond with each other.

The head-mounted display 2a worn by the operator U is a device to present video to the operator U when mounted on the head portion of the operator U. The video controller 124 controls the video to be displayed to the head-mounted display 2a. The connecting information presenting part 126 causes the video controller 124 to generate a guide video for leading the operator to take a posture such that the posture of the slave robot R and the posture of the operator U come to correspond with each other. The video controller 124 transmits a video signal, which causes the head-mounted display 2a to make a display, to the head-mounted display 2a via the transmitting controller 121 to cause the head-mounted display 2a to display the video. Specifically, the video controller 124 generates the guide video such that the posture error between the posture of the slave robot R and the posture of the operator U is reduced if the operator U moves according to the guide video displayed on the head-mounted display 2a. Thus, the operator U can smoothly synchronize with the slave robot R.

Hereinafter, for convenience of explanation, the description will be made as "the video controller 124 displays the video on the head-mounted display 2a" on the assumption that video signal to be displayed on the head-mounted display 2a is transmitted by the video controller 124 to the head-mounted display 2a via the transmitting controller 121, thereby displaying the video on the head-mounted display 2a.

Figure 5A:
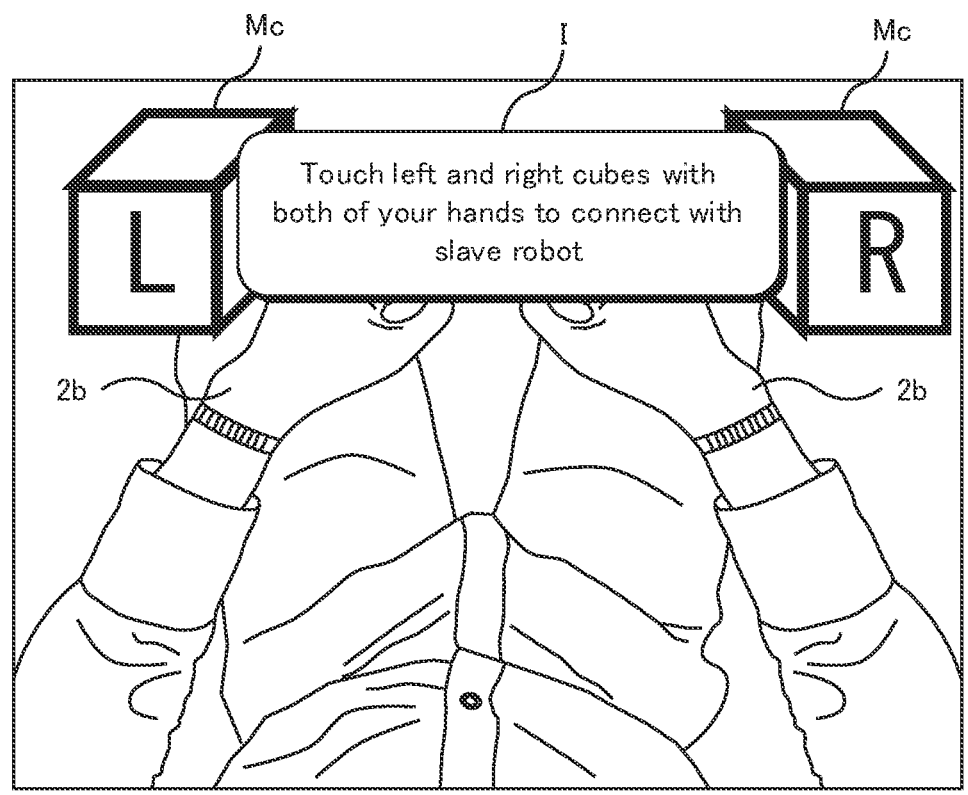
FIG. 5A illustrates an exemplary guide video generated by a video controller according to the embodiment.
Figure 5B:
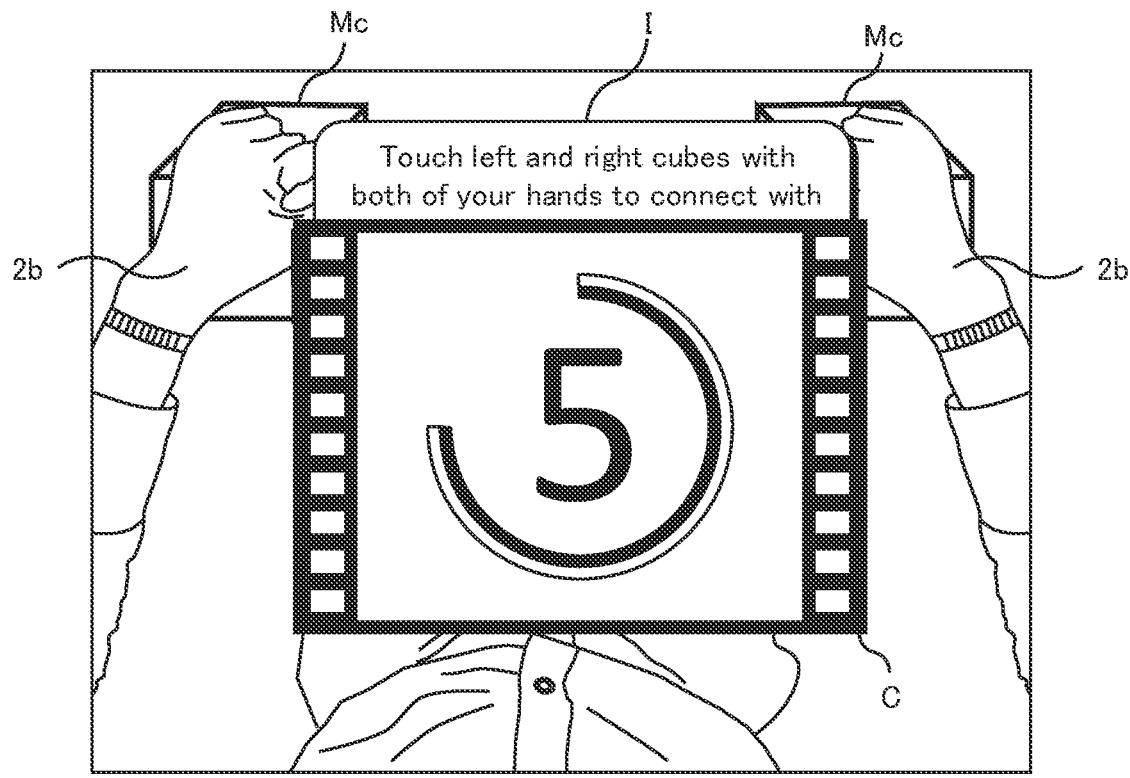
FIG. 5B illustrates an exemplary guide video generated by a video controller according to the embodiment.

FIGS. 5A and 5B illustrate an exemplary guide video generated by the video controller 124 according to the embodiment. FIGS. 5A and 5B show video that is displayed on the monitor of the head-mounted display 2a prior to the synchronization between the motion of the slave robot R and the motion of the operator U being started. FIGS. 5A and 5B therefore show the thigh, forearms, hands, and lower abdomen of the operator U captured by the imaging element 2d provided to the head-mounted display 2a.

As shown in FIG. 5A, the video controller 124 causes the head-mounted display 2a to display two virtual cubes Mc as well as a message I instructing the operator to touch the cubes with both of his/her hands. Both the virtual cubes Mc and the message I do not actually exist and are a guide video generated by the video controller 124 using the Augmented Reality (AR) technique.

When a stereoscopic video of the hand portion of the slave robot R captured by the imaging element 3a provided to the head portion of the slave robot R is displayed on the head-mounted display 2a, the video controller 124 generates the guide video such that the virtual cube Mc is displayed at a position where the hand portion of the slave robot R is perceived by the operator U. Therefore, as shown in FIG. 5B, the operator U "touching" the cubes Mc displayed on his/her left-hand side and right-hand side with his/her left hand and right hand respectively causes the posture error between the posture of the operator U and the posture of the slave robot R to be naturally within the predetermined threshold range. In this sense, the virtual cube Mc generated by the video controller 124 can be referred to as a "connection marker" displayed for connecting the motion of the operator U and the motion of the slave robot R.

When the posture error between the posture of the operator U and the posture of the slave robot R is within the predetermined threshold range, the video controller 124 displays a countdown video C on the head-mounted display 2a. FIG. 5B shows an example in which the countdown video C lasting for 5 seconds is displayed. The operator U stays still while touching the cubes Mc, and after 5 seconds passes in that state, the motion connecting part 123 transmits the operation signal to the slave robot R.

In this case, the motion connecting part 123 transmits the motion signal to the slave robot R on a condition that a predetermined period of time passes in a state in which the posture error becomes within the predetermined threshold range. Here, the "predetermined period of time" is a "standby period before synchronization" in which the motion connecting part 123 stands by before starting the synchronization between the motion of the slave robot R and the motion of the operator U. The operator U stands by for the predetermined period of time while the posture error is within the predetermined threshold range, and so the operator U can prepare to operate the slave robot R. Compared to the case where the synchronization between the motion of the slave robot R and the motion of the operator U is suddenly started by the motion connecting part 123, the control apparatus 1 can reduce the discrepancy in sensations felt by the operator U because he/she can prepare to enter a virtual space.

The video controller 124 displays, on the head-mounted display 2a, the stereoscopic video acquired by the imaging element 2d provided to the head-mounted display 2a prior to the motion connecting part 123 transmitting the operation signal to the slave robot R Further, because the motion of the slave robot R and the motion of the operator U are synchronized while the motion connecting part 123 is transmitting the operation signal to the slave robot R, the video controller 124 causes the head-mounted display 2a to switch and display the stereoscopic video captured by the imaging element 3a provided to the slave robot R.

Here, at the time when the motion of the slave-robot R and the motion of the operator U are synchronized, the video controller 124 may perform an effect related to switching the video. For example, the video controller 124 may causes the video acquired by the imaging element 3a to fade in while the stereoscopic video acquired by the imaging element 2d is fading out. Since it makes it easier for the operator to be aware of switching between the video of the environment where he/she is actually present and the video of the environment where the slave robot R is placed, the operator U can prepare to operate the slave robot R.

Further, even before the motion connecting part 123 starts transmitting the operation signal to the slave robot R, the video controller 124 may cause the head-mounted display 2a to display the stereoscopic video captured by the imaging element 3a provided to the slave robot R at a timing of displaying the countdown video C to the head-mounted display 2a.

Although not shown in figures, if the stereoscopic video captured by the imaging element 3a provided to the slave robot R is displayed on the head-mounted display 2a before the motion connecting part 123 starts transmitting the operation signal to the slave robot R, the video controller 124 may display a message indicating that the synchronization is to be started on the head-mounted display 2a. Further, if the stereoscopic video captured by the imaging element 3a provided to the slave robot R is displayed on the head-mounted display 2a before the motion connecting part 123 starts transmitting the operation signal to the slave robot R, the video controller 124 may make a display mode of the stereoscopic video different from the display mode after the start of transmission (for example, by changing the brightness value). This allows the operator U to observe the video of the environment where the slave robot R that is to be synchronized is placed prior to the synchronization, so that the operator U can prepare to operate the slave robot R.

It should be noted that the audio controller 127 outputs sound collected by the microphone 3c to the headphone 2c at the same timing as when the video controller 124 switches the video displayed on the head-mounted display 2a to the stereoscopic video captured by the imaging element 3a. As a result, discrepancy between the visual information and the auditory information felt by the operator U can be suppressed.

Incidentally, the cube Mc displayed on the head-mounted display 2a by the video controller 124 is an AR video, and is a virtual object that does not actually exist. Thus, the operator U cannot actually touch the cube Mc. Hence, when the operator U stays still while "touching" the cube Mc, his/her hand portion is actually resting in an empty space.

Here, as described above while referencing FIG. 1, the operator U of the remote control system S is equipped with the tactile presentation device 2b that presents, to the hand portion of the operator U when worn by the operator U, tactile information acquired by the tactile sensor 3b provided to the hand portion of the slave robot R. Therefore, the control apparatus 1 includes a tactile signal generator 125 that generates a tactile presentation signal for operating the tactile presentation device 2b.

Accordingly, the tactile signal generator 125 may generate the tactile presentation signal regardless of whether or not the tactile sensor 3b of the slave robot R acquires the tactile information, on a condition that the position of the hand portion of the operator U in the stereoscopic video displayed by the head-mounted display 2a and the position of the surface of the cube Mc which is the connection marker overlap. Specifically, the tactile signal generator 125 generates the tactile presentation signal that reproduces the tactile sensation to be felt by the operator when the cube is touched. As a result, the operator U can acquire the feeling of "touching" the cube Mc, so that the control apparatus 1 can easily make the operator U stay still in the state of "touching" the cube Mc.

The motion of the control apparatus 1 when starting the synchronization between the motion of the slave robot R and the motion of the operator U has been mainly described above. Next, the operation of the control apparatus 1 when the synchronization between the motion of the slave robot R and the motion of the operator U is ended will be described.

Once the motion of the slave robot R is synchronized with the motion of the operator U, the video captured by the imaging element 3a provided to the slave robot R is displayed on the head-mounted display 2a worn by the operator U. It can be said that the operator U is observing a kind of Virtual Reality (VR) video because of the reason that the operator U is not observing the video of the environments where he/she is present.

Therefore, when the motion of the slave robot R and the motion of the operator U are synchronized, the tactile signal generator 125 generates a virtual disconnection marker for getting out of the synchronization between the motion of the operator U and the motion of the slave robot R and displays the virtual disconnection marker on the head-mounted display 2a.

Figure 6:
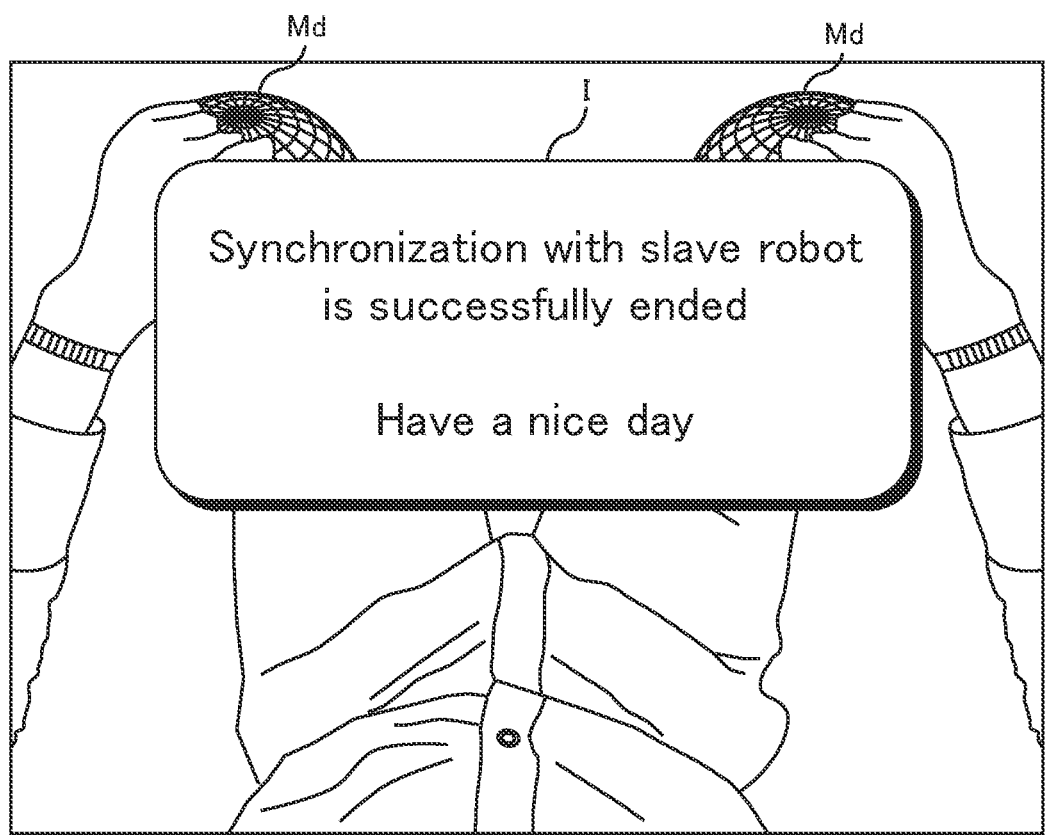
FIG. 6 illustrates an exemplary virtual disconnection marker for getting out of synchronization between a motion of a slave robot and a motion of an operator.

FIG. 6 shows another example of the guide video generated by the video controller 124 according to the embodiment, and shows the virtual disconnection marker for getting out of the synchronization between the motion of the slave robot R and the motion of the operator U. Specifically, FIG. 6 shows an example of the video displayed on the head-mounted display 2a immediately after the synchronization between the motion of the operator U and the motion of the slave robot R is gotten out where the disconnection marker is a virtual sphere Md.

The motion connecting part 123 stops transmitting the operation signal to the slave robot R on a condition that the position of the hand portion of the operator U overlaps with the position of the surface of the sphere Md that is the disconnection marker in the stereoscopic video displayed on the head-mounted display 2a. Once the motion connecting part 123 stops transmitting the operation signal to the slave robot R, the video controller 124 displays, on the head-mounted display 2a, the stereoscopic video acquired by the imaging element 2d provided to the head-mounted display 2a.

In addition, the tactile signal generator 125 generates the message I indicating that the synchronization between the motion of the slave robot R and the motion of the operator U has been ended, and causes the message I to be displayed on the head-mounted display 2a. This allows the operator U to know that the synchronization between the motion of the slave robot R and the motion of the operator U has been ended, thereby letting the operator U know the timing of taking off each of the presentation devices 2.

The tactile signal generator 125 generates the tactile presentation signal for the case where the user U touches the sphere Md regardless of whether or not the tactile sensor 3b acquires the tactile information on a condition that the position of the hand portion of the slave robot R overlaps with the position of the surface of the sphere Md that is the disconnection marker in the stereoscopic video displayed on the head-mounted display 2a. This allows the operator U to actually feel "touching" of the sphere Md for releasing the synchronization with the slave robot R.

FIG. 7 shows the operation of the control apparatus at the start/end of the synchronization between the motion of the slave robot R and the motion of the operator U in a table format. As shown in FIG. 7, the video controller 124 makes the shape of the connection marker displayed on the head-mounted display 2a for starting the synchronization between the motion of the slave robot R and the motion of the operator U different from the shape of the disconnection marker displayed on the head-mounted display 2a for ending the synchronization between the motion of the slave robot R and the motion of operator U. In addition, the tactile signal generator 125 makes a virtual feel set on the connection marker different from the virtual feel set on the disconnection marker.

Specifically, as shown in FIG. 7, the connection marker has a cubic shape and smooth feel. Further, the disconnection marker has a spherical shape and rough feel. As a result, the operator U can recognize the marker by its shape and feel without seeing the connection marker or the disconnection marker.

As described above, at the time when the synchronization between the motion of the slave robot R and the motion of operator U is started, the video controller 124 gradually switches the video displayed on the head-mounted display 2a. This is for the operator U to be prepared for operating the slave robot R.

On the other hand, at the time when the synchronization between the motion of the slave-robot R and the motion of the operator U is ended, the video controller 124 instantaneously switches the video displayed on the head-mounted display 2a. This is because the video captured by the imaging element 2d substantially corresponds with the view captured by the operator U's own eye, and therefore, the discrepancy in sensation of the operator U is unlikely to occur. Instead, as shown in FIG. 6, the video controller 124 displays the message I after switching the video when the synchronization between the motion of the slave robot R and the motion of the operator U is ended. This is because there is no need to do something while watching the video of the head-mounted display 2a after the synchronization is ended, and rather, the control apparatus 1 needs to inform the operator U when to take off each of the presentation devices 2.

As described above, the video controller 124 makes the effect at the end of the synchronization different from the effect at the start of the synchronization between the motion of the slave robot R and the motion of the operator U. This allows the operator U to intuitively recognize whether the synchronization between the motion of the slave robot R and the motion of the operator U is started or ended.

<A Process Flow of a Learning Method Executed by the Control Apparatus 1>

Figure 8:
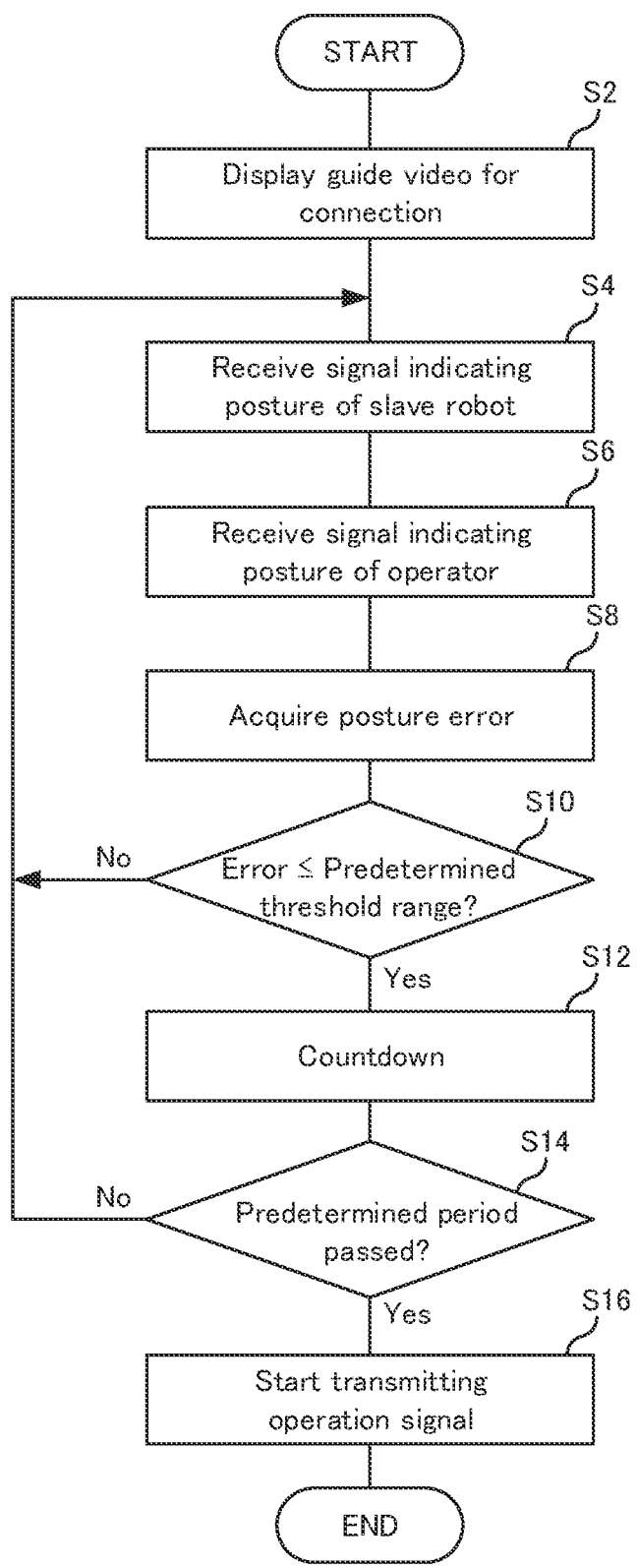
FIG. 8 is a flowchart for explaining a flow of the process at the start of the synchronization performed by the control apparatus according to the embodiment.

FIG. 8 is a flowchart for explaining a flow of the process at the start of the synchronization performed by the control apparatus 1 according to the embodiment. The process in this flow chart starts, for example, when the control apparatus 1 receives information indicating that the capture device 4 has been activated.

The video controller 124 causes the head-mounted display 2a to display the guide video for leading the operator U to take a posture such that the posture of the slave robot R and the posture of the operator U come to correspond with each other (step S2). The receiving controller 120 receives, from the slave robot R, a signal indicating the posture of the slave robot R (step S4). Further, the receiving controller 120 receives the signal indicating the posture of the operator U's body from the capture device 4 (step S6).

The posture comparing part 122 acquires the posture error indicating the difference between the posture of the slave robot R and the posture of the operator U (step S8). If the posture error acquired by the posture comparing part 122 is within the predetermined threshold range (YES in step S10), the video controller 124 displays the countdown video C on the head-mounted display 2a until the predetermined period passes (step S2).

If the posture error acquired by the posture comparing part 122 is out of the predetermined threshold range (NO in step S10) or if the predetermined period has not passed (NO in step S14), the control apparatus 1 returns to step S4 and repeats the process from step S4 to step S14.

When the posture error acquired by the posture comparing part 122 is within the predetermined threshold range for the predetermined period of time (YES in step S14), the motion connecting part 123 starts transmitting the operation signal for operating the slave robot R generated on the basis of the change in the posture of the operator U (step S16). When the motion connecting part 123 starts transmitting the operation signal, the process in this flowchart ends.

<Effects of the Control Apparatus 1 According to the Embodiment>

As described above, according to the control apparatus 1 according to the embodiment, it is possible to reduce the discrepancy in sensations felt by the operator U when starting the synchronization between the motion of the slave robot R of the remote control system S and the motion of the operator U.

It should be noted that the order of the process described above is an example, and the order of the steps can be appropriately changed, or some of the steps can be omitted. For example, the process of step S4 and the process of step S6 may be reversed in order or may be executed in parallel. Further, when the posture of the slave robot R is determined in advance, the process of step S4 may be omitted, or the process may be performed only once before step S2.

The present disclosure is explained on the basis of the exemplary embodiments. The technical scope of the present disclosure is not limited to the scope explained in the above embodiments and it is possible to make various changes and modifications within the scope of the disclosure. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments. Hereinafter, such a variation will be described.

<First Variation>

In the above description, the video controller 124 displays the connection marker on the head-mounted display 2a when the synchronization between the motion of the slave robot R and the motion of the operator U is started. Alternately or additionally, for example, a text or illustration describing the posture that the operator U should take to initiate the synchronization may be displayed on the head-mounted display, or the guide video with an icon such as an arrow may be displayed on the head-mounted display.

<Second Variation>

In the above description, the connecting information presenting part 126 presents guide information to the operator U in audio or video when starting and ending the synchronization between the motion of the slave robot R and the motion of the operator U. Alternately or additionally, the connecting information presenting part 126 may present a tactile guide to the operator U. In this case, the connecting information presenting part 126 may cause the tactile signal generator 125 to generate a signal that makes the tactile sense presented to the operator U smaller as the posture of the operator U approaches the posture that the operator should take to have the posture of the slave robot R and the posture of the operator U correspond with each other.

<Third Variation>

In the above description, the video controller 124 displays the disconnection marker on the head-mounted display 2a when the synchronization between the motion of the slave robot R and the motion of the operator U is ended. Alternatively or additionally, the synchronization between the motion of the slave robot R and the motion of the operator U may be ended when the control apparatus 1 receives an operator U's utterance instructing disconnection.

In order to realize this, the operator U is equipped with a microphone (not shown in figures) so that the control apparatus 1 can acquire the operator's utterance. Further, a sound recognizing part (not shown in figures) included in the controller 12 of the control apparatus 1 analyzes the operator U's utterance, and the synchronization between the motion of the slave robot R and the motion of the operator U may be ended if the disconnection instruction is received.

<Fourth Variation>

If one slave robot R is operated sequentially by more than one operator U, a different operator U may take over an operation right of the slave robot R instead of the operator U who is operating the slave robot R. In this instance, the slave robot R may move in synchronization with the motion of the previous operator U at the time when the operator U inheriting the operation right attempts to synchronize with the slave robot R.

Therefore, the video controller 124 may acquire information indicating the position of the hand portion of the slave robot R in time series and change a location of displaying the connection marker in accordance with the change in the position of the hand portion of the slave robot R. A connection marker that moves with the passage of time is presented to the head-mounted display 2a of the operator U who intends to inherit the operation right. The motion connecting part 123 starts the synchronization between the operator U and the slave robot R when the operator U touches the moving connection marker. This allows the control apparatus 1 to smoothly pass the operation right of the slave robot R between operators U when one slave robot R is operated sequentially by more than one operator U.

<Fifth Variation>

In the above, the capture device 4 for acquiring the motion of the operator U's body has been described as being an "outside-in" type of motion capture device that captures a tracking marker attached to the operator U's body with a camera using, for example, infrared or visible light. Alternatively or additionally, the capture device 4 may be an "inside-out" type of motion capture device that analyzes an image captured by a camera attached to the operator U (for example, a camera provided to the head-mounted display 2a) to acquire the motion of the operator U's body.

<Sixth Variation>

In the above, the posture comparing part 122 acquires, as the posture error, at least the sum of 1) the difference E between the position of the head portion of the slave robot R and the position of the head portion of the operator U and 2) the difference E between the position of the hand portion of the slave robot R and the position of the hand portion of the operator U, when the slave robot R and the operator U are virtually superimposed. Here, the posture comparing part 122 may generate a posture model of the operator U by simulation on the basis of the signal indicating the posture of the operator U's body, and compare the posture model with the posture of the slave robot R to acquire the posture error.

<Seventh Variation>

In the above description, it has been mainly described that the posture error between the posture of the operator U and the posture of the slave robot R is reduced by the operator U moving before starting the synchronization between the motion of the operator U and the motion of the slave robot R. Alternatively or additionally, the posture error may be reduced by the slave robot R moving before starting the synchronization between the motion of the operator U and the motion of the slave robot R.

Specifically, the motion connecting part 123 transmits, to the slave robot, the operation signal for operating the slave robot R so that the posture error acquired by the posture comparing part 122 becomes within the predetermined threshold range. Thus, the control apparatus 1 can start synchronization between the motion of the operator U and the motion of the slave robot R without the operator U moving.

The connecting information presenting part 126 may present information to the operator U to prompt him/her to stay still while the slave robot R is moving in order to reduce the posture error before starting the synchronization between the motion of the operator U and the motion of the slave robot R. Thus, the control apparatus 1 can suppress the posture error being increased by the operator U moving while the slave robot R is moving.

<Eighth Variation>

In the above, the video controller 124 generates the guide video when the stereoscopic video captured by the imaging element 3a provided on the head portion of the slave robot R is displayed on the head-mounted display 2a so that the virtual cube Mc is displayed at the position where the hand portion of the slave robot R is perceived by the operator U. Alternatively, the video controller 124 may display the virtual cube Mc at a fixed position, regardless of the actual position of the hand portion of the slave robot R.

In this case, the motion connecting part 123 operates the slave robot R so that the hand portion of the slave robot R moves to the displayed position of the virtual cube Mc. On the other hand, the connecting information presenting part 126 presents, to the operator U, information for leading the hand portion of the operator U to the displayed position of the virtual cube Mc. In this way, the control apparatus 1 can start the synchronization between the motion of the operator U and the motion of the slave robot R from the same position (that is, from the displayed position of the virtual cube Mc) at all times.

What is claimed is:

1. A remote control system comprising:
   a slave robot that moves in conjunction with a change in a posture of an operator;
   a capture device that acquires a signal indicating the posture of the operator, the posture of the operator being a posture of an operator's body; and
   a control apparatus, wherein
   the control apparatus includes:
   a receiving controller that receives a signal indicating a posture of the slave robot from the slave robot and receives the signal indicating the posture of the operator from the capture device,
   a posture comparing part that acquires a posture error indicating a difference between the posture of the slave robot and the posture of the operator, and
   a motion connecting part that transmits, to the slave robot, an operation signal for operating the slave robot generated based on the change in the posture of the operator on a condition that the posture error is within a predetermined threshold range, wherein
   the control apparatus further includes a connecting information presenting part configured to present at least one of audio information and visual information to the operator to prompt the operator to stay still while the slave robot is moving to reduce the posture error before starting a synchronization between a motion of the operator and a motion of the slave robot.

2. The remote control system according to claim 1, wherein
   the connecting information presenting part presents, to the operator, information for leading the operator to take a posture such that the posture of the slave robot and the posture of the operator come to correspond with each other before the motion connecting part transmits the operation signal to the slave robot.

3. The remote control system according to claim 1, further comprising:
   a head-mounted display that presents video to the operator; wherein
   the control apparatus further includes a video controller that controls video to be displayed on the head-mounted display, and
   the video controller generates a guide video for leading the operator to take a posture such that the posture of the slave robot and the posture of the operator come to correspond with each other prior to the motion connecting part transmitting the operation signal to the slave robot.

4. The remote control system according to claim 3, wherein
   the video controller causes the head-mounted display to display the video captured by an imaging element included by the slave robot while the motion connecting part is transmitting the operation signal to the slave robot.

5. The remote control system according to claim 3, wherein
   the video controller generates the guide video such that a virtual connection marker is displayed at a position where a hand portion of the slave robot is perceived by the operator when the video captured by an imaging element provided to a head portion of the slave robot is displayed on the head-mounted display.

6. The remote control system according to claim 5, further comprising:
   a tactile presentation device that presents tactile information, acquired by a tactile sensor provided to the hand portion of the slave robot, to a hand portion of the operator, wherein
   the control apparatus further includes a tactile signal generator that generates a tactile presentation signal for operating the tactile presentation device, and
   the tactile signal generator generates the tactile presentation signal on a condition that a position of the hand portion of the operator overlaps with the position of the virtual connection marker in the video.

7. The remote control system according to claim 3, wherein
   the video controller generates a virtual disconnection marker for getting out of the synchronization between the motion of the operator and the motion of the slave robot, and
   the motion connecting part stops transmitting the operation signal to the slave robot on a condition that a position of a hand portion of the operator overlaps with a position of the virtual disconnection marker in the video.

8. The remote control system according to claim 3, wherein
   the video controller generates the guide video so that a display position of a virtual connection marker is changed and displayed according to a change in a position of a hand portion of the slave robot when the video captured by an imaging element provided to a head portion of the slave robot is displayed on the head-mounted display, and
   the operation connecting part transmits the operation signal to the slave robot on a condition that the operator touches the virtual connection marker.

9. The remote control system according to claim 1, wherein
   the motion connecting part transmits the operation signal to the slave robot on a condition that a predetermined period of time passes in a state where the posture error is within the predetermined threshold range.

10. The remote control system according to claim 1, wherein
the motion connecting part transmits, to the slave robot, the operation signal for operating the slave robot so that the posture error acquired by the posture comparing part becomes within the predetermined threshold range.

11. The remote control system according to claim 1, wherein
the slave robot is a humanoid robot including at least a head portion and a hand portion corresponding to a head portion and a hand portion of the operator,
the posture comparing part acquires, as the posture error, a sum of 1) a difference between a position of the head portion of the slave robot and a position of the head portion of the operator and 2) a difference between a position of the hand portion of the slave robot and a position of the hand portion of the operator, when the slave robot and the operator are virtually superimposed.

12. An information processing method performed by a control apparatus in a remote control system including a slave robot moving in conjunction with a change in a posture of an operator, a capture device for acquiring a signal indicating the posture of the operator, the posture of the operator being a posture of an operator's body, and the control apparatus, the method comprising:
receiving a signal indicating a posture of the slave robot from the slave robot;
receiving a signal from the capture device indicating the posture of the operator;
acquiring a posture error indicating a difference between the posture of the slave robot and the posture of the operator;
transmitting, to the slave robot, an operation signal for operating the slave robot generated based on a change in the posture of the operator on a condition that the posture error becomes within a predetermined threshold; and
presenting at least one of audio information and visual information to the operator to prompt the operator to stay still while the slave robot is moving to reduce the posture error before starting a synchronization between a motion of the operator and a motion of the slave robot.

13. A non-transitory computer-readable recording medium recording a program causing a control apparatus in a remote control system to implement functions, the remote control system including a slave robot that moves in conjunction with a change in a posture of an operator, a capture device that acquires a signal indicating the posture of the operator, the posture of the operator being a posture of an operator's body, and the control apparatus, the functions including:
receiving a signal indicating a posture of the slave robot from the slave robot;
receiving a signal indicating the posture of the operator from the capture device;
acquiring a posture error indicating a difference between the posture of the slave robot and the posture of the operator;
transmitting, to the slave robot, an operation signal for operating the slave robot generated based on a change in the posture of the operator on a condition that the posture error becomes within a predetermined threshold range; and
presenting at least one of audio information and visual information to the operator to prompt the operator to stay still while the slave robot is moving to reduce the posture error before starting a synchronization between a motion of the operator and a motion of the slave robot.

* * * * *